(12) United States Patent
Al-Nakhli et al.

(10) Patent No.: US 11,773,316 B1
(45) Date of Patent: Oct. 3, 2023

(54) METHOD AND COMPOSITION FOR ACIDIZING A SUBSURFACE FORMATION UTILIZING A NITROGEN GAS-GENERATING TREATMENT FLUID

(71) Applicant: Saudi Arabian Oil Company, Dhahran (SA)

(72) Inventors: Ayman R. Al-Nakhli, Dammam (SA); Bader G. Harbi, Dammam (SA); Mohammed Ali Al-Yami, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/838,667

(22) Filed: Jun. 13, 2022

(51) Int. Cl.
*E21B 43/27* (2006.01)
*C09K 8/74* (2006.01)
*C09K 8/70* (2006.01)
*C09K 8/72* (2006.01)
*C09K 8/60* (2006.01)

(52) U.S. Cl.
CPC ............. *C09K 8/74* (2013.01); *C09K 8/602* (2013.01); *C09K 8/703* (2013.01); *C09K 8/725* (2013.01); *E21B 43/27* (2020.05); *C09K 2208/10* (2013.01)

(58) Field of Classification Search
CPC .......... C09K 8/74; C09K 8/602; C09K 8/703; C09K 8/725; C09K 2208/10; E21B 43/27
See application file for complete search history.

(56) References Cited

U.S. PATENT DOCUMENTS

| | | | |
|---|---|---|---|
| 4,846,277 A | | 7/1989 | Khalil et al. |
| 7,772,162 B2 | | 8/2010 | Pope et al. |
| 10,851,282 B2 | | 12/2020 | Janak et al. |
| 10,895,136 B2 | | 6/2021 | Al-Nakhli et al. |
| 2004/0254079 A1 | * | 12/2004 | Frenier .................... C09K 8/74 507/260 |
| 2010/0200230 A1 | * | 8/2010 | East, Jr. ................ E21B 43/267 166/272.2 |
| 2010/0270021 A1 | * | 10/2010 | Baran, Jr. ................ C09K 8/80 166/305.1 |
| 2013/0126169 A1 | * | 5/2013 | Al-Nakhli ........... E21B 43/2405 507/213 |
| 2014/0054050 A1 | | 2/2014 | Lindsay et al. |
| 2015/0300143 A1 | * | 10/2015 | Al-Nakhli ............. E21B 43/267 166/280.1 |
| 2018/0334614 A1 | * | 11/2018 | Bulekbay ................. C09K 8/74 |
| 2020/0270505 A1 | * | 8/2020 | Reddy ................. C04B 40/0039 |
| 2021/0024815 A1 | * | 1/2021 | Al-Taq ..................... C09K 8/80 |

FOREIGN PATENT DOCUMENTS

| | | |
|---|---|---|
| WO | 2015171596 A1 | 11/2015 |
| WO | 2017079386 A1 | 5/2017 |

OTHER PUBLICATIONS

Malik et al., "Successful Implementation of CO2 Energized Acid Fracturing Treatment in Deep, Tight and Sour Carbonate Gas Reservoir in Saudi Arabia that Reduced Fresh Water Consumption and Enhanced Well Performance", Society of Petroleum Engineers, SPE-172620-MS, Mar. 8-11, 2015.

Sayed et al., "Mitigation of the Effects of Condensate Banking: a Critical Review", Society of Petroleum Engineers, Production & Operation, pp. 85-102, May 2016.

* cited by examiner

*Primary Examiner* — Silvana C Runyan
(74) *Attorney, Agent, or Firm* — DINSMORE & SHOHL LLP

(57) ABSTRACT

A method for acidizing a subsurface formation using a treatment fluid includes injecting a treatment fluid including a strong acid, a buffer, a thermochemical component, a foaming agent and nanoparticles into the wellbore, thereby exposing the treatment fluid to subsurface formation conditions. The method further includes allowing a temperature of the wellbore to activate the thermochemical component, causing an exothermic reaction generating nitrogen gas, pressure, and heat, thereby forming fractures within the subsurface formation. The method further includes allowing the treatment fluid and nitrogen gas to mix within the subsurface formation, thereby forming a foamed acid within the fractures to acidize the subsurface formation.

13 Claims, 1 Drawing Sheet

METHOD AND COMPOSITION FOR ACIDIZING A SUBSURFACE FORMATION UTILIZING A NITROGEN GAS-GENERATING TREATMENT FLUID

TECHNICAL FIELD

The present disclosure relates to methods and compositions for acidizing a subsurface formation, and more specifically, to methods and compositions for acidizing a subsurface formation using a foamed acid.

BACKGROUND

In oil and gas drilling, wellbore stimulation is a common treatment performed in subsurface formations to enhance or restore the productivity of oil and gas from a wellbore. Acid treatments may be used for wellbore stimulation. Acidizing is a stimulation acid treatment technique in which a treatment fluid including aqueous acid solution is delivered into the subsurface formation to dissolve acid-soluble materials. This may increase the permeability of a treatment zone and enhance well production by increasing the effective wellbore radius. Acidizing is regarded as the process of pumping acid into a wellbore or subsurface formation to improve a well's productivity.

Acidizing commonly occurs in two forms, matrix acidizing and fracture acidizing. Matrix acidizing is regarded as acidizing below subsurface formation breakdown pressure. Fracture acidizing is regarded as acidizing above formation pressure. Acidizing may commonly improve a well's productivity by dissolving material in a subsurface formation that blocks flow paths to the wellbore. Acidizing may also improve a well's productivity by dissolving the formation rock, thereby creating new flow paths to the wellbore or enlarging pre-existing ones. Acidizing above formation pressure, as in fracture acidizing, may cause fractures to form in the subsurface formation, increasing the area in which the acid may potentially dissolve rock and enlarge fluid flow paths.

SUMMARY

Acidizing processes generally increase the total stimulated volume of subsurface formations, typically correlating to an increase in hydrocarbon production and recovery. However, acidizing may often result in large amounts of acid needing to be injected to achieve the desired stimulated volume of the subsurface formation, as some acid leaks off to secondary fractures that generally do not add to the stimulated reservoir volume. Accordingly, some acidizing processes include foaming the injected acid to reduce fluid leakoff and reduce acid volumes.

Conventional foamed acidizing methods require special gas pumping units to mix the foamed acid and inject it into the subsurface formation. Two parameters of these foamed acidizing processes are foam injection rate and foam quality. Foam quality is typically expressed as a percentage of gas volume entrained within the foam at a set pressure and temperature. High foam quality, for example between 52% and 96%, may provide benefits including reduced acid leakoff and increased acid viscosity. Low foam quality, for example between 0% and 52%, does not have these same benefits, resulting in greater injected acid volumes and leakoff. Foam injection rate influences fracture lengths during fracture acidizing operations. High foam injection rates, for example 20 to 40 barrels per minute, typically result in greater fracture lengths, increasing the stimulated reservoir volume. Low foam injection rates, for example less than 20 barrels per minute, typically result in smaller fracture lengths, decreasing the stimulated reservoir volume. Current gas pumping units cannot achieve both high injection rate and high foam quality. Current gas pumping units either inject foam at a rate between 7 to 15 barrels per minute at 52% to 60% foam quality or at a rate greater than 20 barrels per minute at 10% to 30% foam quality.

Therefore, methods that allow acidizing of subsurface formations without gas pumping units and without significant acid leakoff are desired. The methods of the present disclosure increase production from hydrocarbon-bearing reservoirs and minimize the volume of acid required by removing the need for additional equipment and gas pumping units to foam the acid and inject it from surface. The acid may be injected at a high injection rate while also maintaining high foam quality. This reduces acid leak off without the tradeoff of reduced fracture lengths. Consequently, less acid is needed to achieve the desired stimulated subsurface formation volume.

The present disclosure is generally directed to compositions and methods for acidizing subsurface formations using a foamed acid while providing the aforementioned desired benefits.

In accordance with one embodiment of the present disclosure, a method includes injecting a treatment fluid comprising a strong acid, a buffer, a thermochemical component, a foaming agent, and nanoparticles into a wellbore, thereby exposing the treatment fluid to subsurface formation conditions; allowing a temperature of the wellbore to activate the thermochemical component, causing an exothermic reaction generating nitrogen gas, pressure, and heat, thereby forming fractures within the subsurface formation; allowing the treatment fluid and nitrogen gas to mix within the subsurface formation, thereby forming a foamed acid within the fractures; and allowing the foamed acid to acidize the subsurface formation.

In accordance with another embodiment of the present disclosure, a treatment fluid for acidizing a subsurface formation includes a strong acid; a buffer; a thermochemical component; a foaming agent; and nanoparticles.

Additional features and advantages of the described embodiments will be set forth in the detailed description, which follows, and in part will be readily apparent to those skilled in the art from that description or recognized by practicing the described embodiments, including the detailed description, which follows, as well as the claims.

BRIEF DESCRIPTION OF THE DRAWINGS

The embodiments set forth in the drawings are illustrative and exemplary in nature and not intended to limit the subject matter defined by the claims. The following detailed description of specific embodiments of the present disclosure may be best understood when read in conjunction with the following drawings, where like structure is indicated with like reference numerals and in which:

Figure 1:
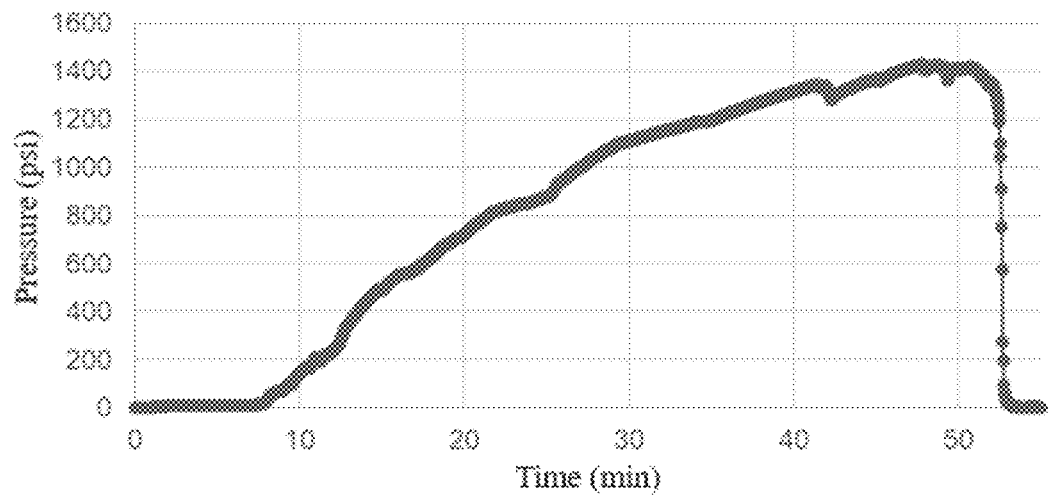
FIG. 1 graphically depicts the relationship between pressure drop across a core (y-axis) and injection time (x-axis) during a coreflood experiment in which a core sample was injected with hydrochloric acid.

during a coreflood experiment in which a core sample was injected with a treatment fluid, according to one or more embodiments herein.

DETAILED DESCRIPTION

Embodiments of the present disclosure are directed to methods of acidizing a subsurface formation and compositions for acidizing subsurface formations.

As used throughout this disclosure, the term "coreflooding system" refers to a coreholder vessel equipped to conduct coreflooding experiments and measurements, including coreflooding gelation time testing. As used throughout this disclosure, the term "coreholder" refers to a vessel designed to withstand elevated temperatures and pressures, such as up to 300° C. and 20,000 pounds per square inch (psi) (137,895 kilopascals (kPa); 1 psi=6.89476 kPa), and to test core samples at these elevated temperatures and pressures.

As used throughout this disclosure, the term "core sample" or "core" refers to a plug, or sample, taken from a whole core from a subsurface formation for analysis. Core samples are conventionally 1 to 1.5 in. (2.5 to 3.8 centimeters (cm); 1 in.=2.54 cm) in diameter and 1 to 2 inches (in.) (5 cm) long. Core samples are conventionally cut perpendicular to the axis of the core or parallel to the axis, which form horizontal and vertical samples, respectively, when cut from a vertical wellbore. Conventional core sample analysis is conducted in a coreholder.

As used throughout this disclosure, the terms "downhole" and "uphole" may refer to a position within a wellbore relative to the surface, with uphole indicating direction or position closer to the surface and downhole referring to direction or position farther away from the surface.

As used throughout this disclosure, the term "foamed acid" may also be referred to as an "energized acid." Energized fluids refer to fluids with one or more compressible gas components dispersed in a volume of liquid. As used throughout this disclosure, the terms "foamed acid" or "energized acid" may refer to an energized fluid wherein the liquid is an acid.

As used throughout this disclosure, the term "foam stability" refers to the time required for half of the volume of liquid contained in the foam to revert to a non-foamed state. As used throughout this disclosure, "foam stability" may also be expressed as a "foam half-life."

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

As previously stated, the present disclosure is directed to compositions and methods for acidizing subsurface formations. Compositions for acidizing subsurface formations include treatment fluids including a strong acid, a buffer, a thermochemical component, a foaming agent, and nanoparticles.

The treatment fluid includes a strong acid. As used in the present disclosure, a "strong acid" refers to an acid that completely dissociates into a hydrogen cation and an anion when placed in a solvent. The strong acid may include hydrochloric acid, nitric acid, sulfuric acid, hydrobromic acid, hydroiodic acid, perchloric acid, chloric acid, or combinations thereof. In embodiments, the strong acid may include hydrochloric acid. The treatment fluid may include from 10 to 40 vol. %, from 10 to 35 vol. %, from 10 to 30 vol. %, from 10 to 25 vol. %, from 15 to 40 vol. %, from 15 to 35 vol. %, from 15 to 30 vol. %, from 15 to 25 vol. %, from 20 to 40 vol. %, from 20 to 35 vol. %, from 20 to 25 vol. %, from 23 to 40 vol. %, from 23 to 35 vol. %, from 23 to 30 vol. %, from 23 to 25 vol. %, or approximately 24 vol. % strong acid as calculated by volume of the treatment fluid.

As previously stated, the treatment fluid includes a buffer. As used in the present disclosure, a "buffer" refers to an acid, a base, or a salt that tends to cause a solution to maintain a constant pH. The buffer may include acetic acid, citric acid, monopotassium phosphate, N-cyclohexyl-2-aminoethanesulfonic acid, or combinations thereof. The treatment fluid may include from 10 to 40 vol. %, from 10 to 35 vol. %, from 10 to 30 vol. %, from 10 to 25 vol. %, from 15 to 40 vol. %, from 15 to 35 vol. %, from 15 to 30 vol. %, from 15 to 25 vol. %, from 20 to 40 vol. %, from 20 to 35 vol. %, from 20 to 25 vol. %, from 23 to 40 vol. %, from 23 to 35 vol. %, from 23 to 30 vol. %, from 23 to 25 vol. %, or approximately 24 vol. % buffer by volume of the treatment fluid.

The treatment fluid further includes a thermochemical component. The thermochemical component may include a nitrite-containing compound and an ammonium-containing compound. The ammonium-containing compound may include ammonium chloride, ammonium bromide, ammonium nitrate, ammonium sulfate, ammonium carbonate, ammonium hydroxide, or combinations thereof. In embodiments, the nitrite-containing compound may include sodium nitrite, potassium nitrite, or combinations thereof. In embodiments, the thermochemical component may include sodium nitrite and ammonium chloride. The treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % of the thermochemical component as calculated by volume of the treatment fluid.

In embodiments, the treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % sodium nitrite as calculated by volume of the thermochemical component.

In embodiments, the treatment fluid may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % ammonium chloride as calculated by volume of the thermochemical component.

In embodiments, at least one salt hydrate may be substituted for either the ammonium-containing compound or the nitrite-containing compound. The salt hydrates that substitute for the ammonium-containing compound may include $MgCl_2 \cdot 6H_2O$, $CaCl_2 \cdot 2H_2O$, or both. The salt hydrates that substitute for the nitrite-containing compound may include $MgSO_4 \cdot 7H_2O$, $Al_2SO_4 \cdot 8H_2O$, or both. The thermochemical component may further include at least one acid salt, the acid salt being acidic after being dissolved in a solvent. The acid salt may include $NaHCO_3$, $NaHSO_4$, $NaH_2PO_4$, $Na_2HPO_4$, or combinations thereof.

The treatment fluid includes a foaming agent. As described herein, a "foaming agent" refers to an additive that entrains gas within a fluid, creating a foam solution with a lowered density than before the gas was entrained. The foaming agent may include quaternary organosilane, didecyldimethylammonium chloride, a cocamine oxide surfactant, an alkyl imidazoline surfactant, poly [dimethylsiloxane-co-[3-(2-(2-hydroxyethoxy)ethoxy) propyl]methylsiloxane], or combinations thereof. In embodiments, the foaming agent may entrain the nitrogen gas within the treatment fluid, thereby creating the foamed acid. The treatment fluid may include from 0.1 to 5 vol. %, from 0.1 to 4 vol. %, from 0.1 to 3 vol. %, from 0.1 to 2 vol. %, from 0.1 to 1 vol. %, from 1 to 5 vol. %, from 1 to 4 vol. %, from 1 to 3 vol. %, from 1 to 2 vol. %, from 2 to 5 vol. %, from 2 to 4 vol. %, from 2 to 3 vol. %, from 3 to 5 vol. %, from 3 to 4 vol. %, or from 4 to 5 vol. % foaming agent as calculated by volume of the treatment fluid.

As described in more detail herein, different embodiments of the treatment fluid of the composition may be implemented, each containing different chemical additives for the unique acidizing situation. For example, in embodiments, the treatment fluid may further include nanoparticles. The nanoparticles may include silicon dioxide nanoparticles. In embodiments, the silicon dioxide nanoparticles may be suspended in a sodium hydroxide solution. The treatment fluid may include from 0 to 0.5 vol. %, from 0 to 0.4 vol. %, from 0 to 0.3 vol. %, from 0 to 0.2 vol. %, from 0 to 0.1 vol. %, from 0.1 to 0.5 vol. %, from 0.1 to 0.4 vol. %, from 0.1 to 0.3 vol. %, from 0.1 to 0.2 vol. %, from 0.2 to 0.5 vol. %, from 0.2 to 0.4 vol. %, from 0.2 to 0.3 vol. %, from 0.3 to 0.5 vol. %, from 0.3 to 0.4 vol. %, or from 0.4 to 0.5 vol. % nanoparticles as calculated by volume of the treatment fluid.

In embodiments, the treatment fluid may further include a gelling agent, a gel stabilizer, or both. The gelling agent may include guar, hydroxyethyl cellulose, xantham gum, or combinations thereof. The gel stabilizer may include methanol, sodium thiosulfate, or both. Gelling agents typically operate by increasing the viscosity of the fluid the gelling agent is present in, thereby creating a gelled fluid. Gel stabilizers typically operate by stabilizing the viscosity of a gelled fluid at extreme temperatures or by extending the crosslinked time of a crosslinked fluid. The treatment fluid may include from 0 to 0.5 vol. %, from 0 to 0.4 vol. %, from 0 to 0.3 vol. %, from 0 to 0.2 vol. %, from 0 to 0.1 vol. %, from 0.1 to 0.5 vol. %, from 0.1 to 0.4 vol. %, from 0.1 to 0.3 vol. %, from 0.1 to 0.2 vol. %, from 0.2 to 0.5 vol. %, from 0.2 to 0.4 vol. %, from 0.2 to 0.3 vol. %, from 0.3 to 0.5 vol. %, from 0.3 to 0.4 vol. %, or from 0.4 to 0.5 vol. % gelling agent as calculated by volume of the treatment fluid. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % gel stabilizer as calculated by volume of the treatment fluid.

The treatment fluid may further include a crosslinker. The crosslinker may include borate, zirconium, chromium, antimony, titanium salts, or combinations thereof. A crosslinker is an additive which links two polymer chains by a covalent or ionic bond. Crosslinking may result in a large increase in viscosity and additional stability of a polymer molecule. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % crosslinker as calculated by volume of the treatment fluid.

The treatment fluid may further include a surfactant. The surfactant may include sodium laureth sulfate, cetyl trimethylammonium bromide, or both. A surfactant is an additive that typically preferentially adsorbs at an interface, lowering the surface tension or interfacial tension between two substances. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % surfactant as calculated by volume of the treatment fluid. In embodiments, the surfactant may increase the amount of the treatment fluid that may be flowed back or otherwise recovered from the subsurface formation by lowering the interfacial tension between the subsurface formation and the treatment fluid.

In embodiments, the treatment fluid may include a clay stabilizer. Clay stabilizers are additives that inhibit the swelling or migration of clays. Clay stabilizers may include potassium chloride, bis-hexamethylene-triamine, bis-hexamethylene-triamine salts, or combinations thereof. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % clay stabilizer as calculated by volume of the treatment fluid.

The treatment fluid may also include a corrosion inhibitor. The corrosion inhibitor may include amidoamines, quaternary amines, amides, phosphate esters, or combinations thereof. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % corrosion inhibitor as calculated by volume of the treatment fluid.

In embodiments, the treatment fluid may include a scavenger. The scavenger may include a hydrogen scavenger, a hydrogen sulfide scavenger, or both. Hydrogen scavengers may include glyoxal or bis(hydroxyalkyl)hydantoins. Hydrogen sulfide scavengers may include but are not limited to oxidants such as inorganic peroxides such as sodium peroxide, or chlorine dioxide, aldehydes or dialdehydes, such as $C_1$-$C_{10}$ aldehydes, formaldehyde, glutaraldehyde, ((meth)acrolein or glyocxal), triazines such as monoethanol amine triazine, and monomethylamine triazine and hydantoins such as hydroxyalkylhydantoins, bis(hydroxyalkyl)hydantoins and dialkylhydantoins where the alkyl group is a $C_1$-$C_6$ alkyl group. The treatment fluid may include from 0 to 0.3 vol. %, from 0 to 0.2 vol. %, from 0 to 0.1 vol. %, from 0.1 to 0.3 vol. %, from 0.1 to 0.2 vol. %, or from 0.2 to 0.3 vol. % scavenger as calculated by volume of the treatment fluid.

Embodiments of the present disclosure also include methods of acidizing a subsurface formation using a treatment fluid. The treatment fluid may be any of the treatment fluids previously described.

In embodiments, the treatment fluid may be mixed at a surface of a wellbore. The treatment fluid may be mixed using any mechanical means, including but not limited to agitation, blending, or stirring.

Following the mixing, the treatment fluid may be injected into the wellbore, thereby exposing the treatment fluid to subsurface formation conditions. The treatment fluid may be injected by surface equipment, such as pumps, creating a differential pressure between the surface and the wellbore. As described herein, "subsurface formation conditions" include, but are not limited to, pH, temperature, pressure, and salinity.

In embodiments, injecting the treatment fluid into the wellbore may include injecting the treatment fluid into a perforation within the wellbore. A "perforation" may refer to a hole made in a casing or liner surrounding a wellbore to create a fluid flow channel between the wellbore and the subsurface formation. Perforations are commonly made by a guided explosive charge on a perforation tool inside the wellbore. In embodiments, the perforation may be located above an isolation tool positioned within the wellbore. The isolation tool may include a packer or a bridge plug. The isolation tool may define an uphole area of the wellbore and a downhole area of the wellbore. The isolation tool may seal off the downhole area of the wellbore from fluid flow. The isolation tool seals off the downhole area of the wellbore from fluid flow by the mechanical methods of the specific type of isolation tool chosen. In embodiments, the perforation may be located below a second isolation tool positioned within the wellbore. This second isolation tool may define an uphole area of the wellbore and a downhole area of the wellbore in between the initial isolation tool and the second isolation tool. The second isolation tool seals off the uphole area of the wellbore from fluid flow by the mechanical methods of the specific type of isolation tool chosen. In embodiments, the isolation tools in combination may be used to ensure that the exothermic reaction activates and creates fractures at a specified depth.

In embodiments, the isolation tool may be a packer or a bridge plug. As described herein, a "packer" may refer to a device that may be lowered into a wellbore with a smaller initial outside diameter than the wellbore that then expands externally against the inside of the wellbore to seal the wellbore. Packers typically operate by squeezing together an elastomeric element between two plates, thereby forcing the elastomeric element to bulge outward against the wellbore, thereby establishing a seal. As described herein, a "bridge plug" may refer to a device that may be lowered into a wellbore with a smaller initial outside diameter than the wellbore that then expands externally to seal against the wellbore. Bridge plugs also may contain a central fluid flow path that may be plugged when an injected ball with greater dimensions than the central flow path seats on the central flow path opening. This operates to completely isolate the downhole area of the wellbore from fluid flow.

In embodiments, injecting the treatment fluid into the wellbore may include injecting the treatment fluid along the interior of tubing within the wellbore leading from the surface to the perforation. In combination with the previously mentioned initial and second isolation tools, the tubing may extend through the second isolation tool to the defined downhole area of the wellbore in between the initial isolation tool and the second isolation tool. This may force the injected treatment fluid to contact the subsurface formation at only a selected interval in between the two isolation tools.

After the treatment fluid has been injected into the wellbore, the treatment fluid may be activated by the subsurface formation conditions to which the treatment fluid has been exposed. In embodiments, the temperature of to the subsurface formation may activate the thermochemical component, causing an exothermic reaction. The exothermic reaction generates nitrogen gas, pressure, and heat within the subsurface formation. The exothermic reaction generating nitrogen gas, pressure and heat within the subsurface formation may also lead to the creation of micro fractures in the subsurface formation, increasing the permeability of the subsurface formation.

In embodiments, the temperature of the wellbore may activate the thermochemical component by raising the temperature of the thermochemical component to a pH determinative reaction activation temperature. For example, and in embodiments, when the pH of the treatment fluid is at 6 pH, the reaction activation temperature of the thermochemical component may be approximately 125° F. In another example, when the pH of the treatment fluid is at 7 pH, the reaction activation temperature of the thermochemical component may be approximately 137° F. In another example, when the pH of the treatment fluid is at 8 pH, the reaction activation temperature of the thermochemical component may be approximately 150° F. In another example, when the pH of the treatment fluid is at 9 pH, the reaction activation temperature of the thermochemical component may be approximately 187° F. In another example, when the pH of the treatment fluid is at 10 pH, the reaction activation temperature of the thermochemical component may be approximately 325° F. In embodiments, lower pH's of the treatment may require lower reaction activation temperatures for the thermochemical component, and vice versa.

As mentioned, the exothermic reaction may generate nitrogen gas, pressure, and heat. The basic reaction that controls the generation of nitrogen gas, pressure, and heat is:

$$A\left(\frac{\text{liquid}}{\text{gas}}\right) + B\left(\frac{\text{liquid}}{\text{gas}}\right) <=> C\,(\text{gas}) + Q\,(\text{heat})$$

In embodiments, the thermochemical component may include ammonium chloride and sodium nitrite. Ammonium chloride and sodium nitrite may make up the first and second reactants of the previously discussed basic reaction. In this specific embodiment, the reaction that controls the generation of nitrogen gas, pressure, and heat is:

$NH_4Cl + NaNO_2 \rightarrow N_2(g) + NaCl + 2H_2O + \text{Heat}$

As previously described, in embodiments, the ammonium chloride may be substituted by hydrate salts including $MgCl_2 \cdot 6H_2O$, $CaCl_2 \cdot 2H_2O$, or both. The immediately previous hydrate salts may react with the nitrite-containing compound in a similar manner as the ammonium-containing compound as previously described. As previously described, in embodiments, the sodium nitrite may be substituted by hydrate salts including $MgSO_4 \cdot 7H_2O$, $Al_2SO_4 \cdot 8H_2O$, or both. The immediately previous hydrate salts may react with the ammonium-containing compound in a similar manner as the nitrite-containing compound as previously described.

Referring again to the basic reaction, and in previous embodiments, the reaction products created by the exothermic reaction, nitrogen gas, pressure, and heat, increase the temperature and pressure within the wellbore and subsurface formation. This may result in tensile fractures when the pressure exceeds the subsurface formation breakdown pressure and thermal fractures when the temperature exceeds a subsurface formation breakdown temperature. The pressure threshold at which new fractures form in the subsurface formation is the subsurface formation breakdown pressure. The temperature threshold at which new fractures form in the subsurface formation is the subsurface formation breakdown temperature.

The method then includes allowing the treatment fluid and nitrogen gas to mix within the subsurface formation, thereby forming a foamed acid within the fractures. The mixing of the treatment fluid and nitrogen forms a foamed acid by the foaming agent entraining the nitrogen gas within the strong acid. The generation of the foamed acid within the wellbore and fractures rather than at surface may remove the need for additional equipment such as nitrogen pumps to inject the treatment fluid and may increase achievable acid injection rate. Generation of the foamed acid may reduce fluid leakoff within the wellbore and subsurface formation, decreasing the required fluid volume to achieve acidizing of the subsurface formation. Generation of the foamed acid may also produce additional flow back energy, increasing total fluid recovery if the foamed acid is flowed back to surface.

The method further includes allowing the foamed acid to acidize the subsurface formation. In embodiments, the foamed acid may acidize the subsurface formation by removing formation damage, dissolving material blocking flow paths to the wellbore, or dissolving parts of the subsurface formation. As described herein, "formation damage" may refer to foreign materials that remain in the wellbore or subsurface formation after drilling operations are finished. These materials may include drilling fluids, filter cake, lost circulation additives and portions of drilling tools. "Formation damage" may also refer to foreign materials that remain in the wellbore or subsurface formation after wellbore perforation operations are finished. These materials may include portions of the perforation tool, portions of a liner or casing, and spent perforation tool charges.

As described in more detail herein, different embodiments of the treatment fluid of the method may be implemented, each containing different chemical additives for the unique acidizing situation. In embodiments, the method includes the further step of allowing the generated pressure to flow back the foamed acid to the surface, thereby recovering the foamed acid. The generated pressure may flow foamed acid to surface by creating a positive pressure differential between the subsurface formation and the surface of the wellbore. In embodiments where the treatment fluid includes a buffer solution, it is contemplated that the buffer solution may delay the exothermic reaction until the thermochemical component is exposed to subsurface formation conditions.

EXAMPLES

The following examples illustrate features of the present disclosure but are not intended to limit the scope of the disclosure.

Example 1

Two treatment fluids, according to embodiments herein, were mixed, activated, and visually compared. Each of the examples were conducted at room temperature, 68 to 72 degrees Fahrenheit (° F.), and atmospheric pressure, 14.7 psi. The treatment fluids were mixed and activated in identical graduated cylinders. Activation of each of the treatment fluids generated a foamed acid. Height of the examples post-activation were measured in milliliters of the graduated cylinders. Foam stability of each of the examples was also measured in time. "Foam stability" refers to the time required for half of the volume of liquid contained in the foam to revert to a non-foamed state.

The first treatment fluid was prepared for mixing by adding 20 mL of 6 molar sodium nitrite, 3 mL of Poly [dimethylsiloxane-co-[3-(2-(2-hydroxyethoxy)ethoxy)propyl] methylsiloxane] as foaming agent, 20 mL of 6 molar ammonium chloride, 4 mL of 99% acetic acid, 20 mL of 20% hydrochloric acid, and 0.25 grams of guar. All chemicals were obtained from Sigma Aldrich. These chemicals were then mixed together in a graduated cylinder. The thermochemical component, including the sodium nitrite and ammonium chloride, was then activated by contact with the acetic acid. Activation generated a foamed acid of 600 mL in height with a foam stability of 20 minutes.

The second treatment fluid was prepared for mixing by adding 20 mL of 6 molar sodium nitrite, 3 mL of Poly [dimethylsiloxane-co-[3-(2-(2-hydroxyethoxy)ethoxy)propyl] methylsiloxane] as foaming agent, 0.5 grams of colloidal silica nanoparticles, 20 mL of 6 molar ammonium chloride, 4 mL of 99% acetic acid, 20 mL of 20% hydrochloric acid, and 0.25 grams of guar. All chemicals were obtained from Sigma Aldrich, with exception to the colloidal silica nanoparticles, which were Grace colloidal silica nanoparticles obtained from Aerosil. These chemicals were then mixed together in a graduated cylinder. The thermochemical component, including the sodium nitrite and ammonium chloride, was then activated by contact with the acetic acid. Activation generated a foamed acid of 1000 mL in height with a foam stability of 4 hours.

The second treatment fluid had the same composition as the first treatment fluid except that the second treatment fluid additionally included 0.5 grams of colloidal silica nanoparticles. In this way, the nanoparticle's effect on a foamed acid's stability and height could be measured. The addition of the nanoparticle in the second treatment fluid generated a foamed acid that was 60% greater in height and with a foam half-life 12 times longer than the first treatment fluid. "Foam stability" may also be expressed as a "foam half-life."

Example 2

Coreflooding analysis was conducted on two dolomite core samples with a porosity of 15% and a permeability of 200 milliDarcys (mD) using a coreflooding system obtained from Core Lab. A confining pressure of 1000 psi on the coreflooding system was initially set through each of the examples. A temperature of 200° F. was also maintained on the coreflooding system to simulate subsurface formation conditions. Pressure was measured at pressure gauges at the inlet and outlet of the core holder to monitor differential pressure across the core. Injection rates were held between 1-2 milliliters per minute (mL/min) throughout all examples.

Six pore volumes (approximately 120 mL) of a 31 wt. % hydrochloric acid solution was injected into a first dolomite core sample. A maximum pressure differential across the core of 60 psi was observed at approximately 20 minutes. A differential pressure of zero, indicating hydrochloric acid breakthrough across the core, was observed at approximately 120 minutes. FIG. 1 shows the pressure drop across the core sample (in psi) as a function of injection time (in minutes) for the first dolomite core injected with the solution including 31 wt. % hydrochloric acid.

Figure 2:
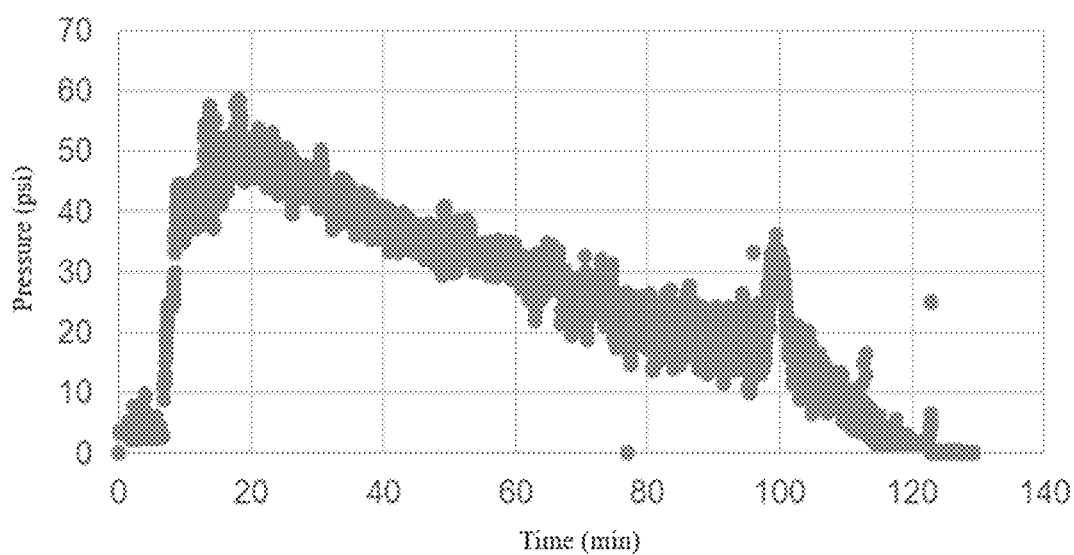
FIG. 2 graphically depicts the relationship between pressure drop across a core (y-axis) and injection time (x-axis)

A second dolomite core was then injected with approximately 50 mL of the second treatment fluid of Example 1. Activation of the thermochemical component occurred when the treatment fluid was exposed to the coreflooding system temperature of 200° F. Activation of the thermochemical component generated an exothermic reaction, thereby generating nitrogen gas, pressure and heat. A maximum pressure differential of 1400 psi was observed at approximately 46 minutes. A differential pressure of zero, indicating treatment fluid breakthrough across the core, was observed at approximately 53 minutes. FIG. 2 shows the pressure drop across the core sample as a function of time in Example 2.

The treatment fluid was then recovered from the second dolomite core sample to assess foam quality. Visual analysis of the treatment fluid after injection into the second dolomite core sample indicated that the exothermic reaction had formed a foamed acid. The treatment fluid before coreflooding injection visually appeared to be a liquid with no entrained gas. Post-injection, significant volumetric expansion of the treatment fluid occurred, owing to the generated nitrogen gas from the exothermic reaction. The treatment fluid also visually appeared to be a gas-liquid foam.

Example 3

CT scans of the dolomite cores used in Example 2 were then taken post coreflooding to analyze fracture formation and fluid leakoff within the cores. CT scans were conducted using a Toshiba RXL (medical type) CT scanner using TOSHIBA voxal.calc software. Analysis of both the first dolomite core sample and the second dolomite core sample showed a central fracture extending along the length of the cores. However, the first dolomite core sample (which was injected with the HCl solution) showed formation of many secondary fractures along the length of the core, indicative of fluid leakoff during the coreflooding. In contrast, the second dolomite core sample (which was injected with the second treatment fluid) did not show many secondary fractures along the length of the core, indicative of less fluid leakoff during the coreflooding. This corresponded to volumetric data gathered, as the second dolomite core sample required approximately 60 percent less injected volume (120 mL to 50 mL) to achieve breakthrough than the first dolomite core sample.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that recitations herein of "at least one" component, element, etc., should not be used to create an inference that the alternative use of the articles "a" or "an" should be limited to a single component, element, etc.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A method of acidizing a subsurface formation with a treatment fluid, comprising:
   mixing a treatment fluid comprising a strong acid, a buffer, a thermochemical component, a foaming agent, and nanoparticles at a surface of the wellbore;
   injecting the treatment fluid into the wellbore, thereby exposing the treatment fluid to subsurface formation conditions;
   allowing a temperature of the wellbore to activate the thermochemical component, causing an exothermic reaction generating nitrogen gas, pressure, and heat, thereby forming fractures within the subsurface formation;
   allowing the treatment fluid and nitrogen gas to mix within the subsurface formation, thereby forming a foamed acid within the fractures; and
   allowing the foamed acid to acidize the subsurface formation, and wherein:
   the strong acid comprises hydrochloric acid, nitric acid, sulfuric acid, hydrobromic acid, hydroiodic acid, perchloric acid, chloric acid, or combinations thereof,
   the buffer comprises acetic acid, citric acid, monopotassium phosphate, N-cyclohexyl-2-aminoethanesulfonic acid, or combinations thereof,
   the thermochemical component comprises a salt hydrate and an acid salt, the salt hydrate comprising $NH_4Cl$, $MgCl_2 \cdot 6H_2O$, $CaCl_2 \cdot 2H_2O$, or combinations thereof and the acid salt comprising $NaNO_2$, $NaHCO_3$, $NaHSO_4$, $NaH_2PO_4$, $Na_2HPO_4$, or combinations thereof.

2. The method of claim 1, further comprising flowing back the foamed acid to the surface by utilising the pressure generated by the exothermic reaction, thereby recovering the foamed acid.

3. The method of claim 1 wherein injecting the treatment fluid into the wellbore comprises injecting the treatment fluid through a perforation within the wellbore.

4. The method of claim 3, wherein:
the perforation is located above an isolation tool comprising a packer or a bridge plug positioned within the wellbore, the isolation tool defining an uphole area of the wellbore and a downhole area of the wellbore; and
the isolation tool seals off the downhole area of the wellbore from fluid flow.

5. The method of claim 1, wherein the treatment fluid comprises from 10 to 40 vol. % strong acid by volume of the treatment fluid.

6. The method of claim 1, wherein the treatment fluid comprises from 10 to 40 vol. % buffer by volume of the treatment fluid.

7. The method of claim 1, wherein
the treatment fluid comprises from 30 to 70 vol. % thermochemical component by volume of the treatment fluid; and
the thermochemical component comprises ammonium chloride as the salt hydrate and sodium nitrite as the acid salt.

8. The method of claim 1, wherein the treatment fluid comprises from 30 to 70 vol. % thermochemical component by volume of the treatment fluid.

9. The method of claim 1, wherein the treatment fluid comprises from 0.1 to 5 vol. % foaming agent by volume of the treatment fluid, the foaming agent comprising a quaternary organosilane, didecyldimethylammonium chloride, a cocamine oxide surfactant, an alkyl imidazoline surfactant, poly[dimethylsiloxane-co-[3-(2-(2-hydroxyethoxy)ethoxy)propyl]methylsiloxane], or combinations thereof.

10. The method of claim 1, wherein the treatment fluid comprises from 0.1 to 0.5 vol. % nanoparticles by volume of the treatment fluid, the nanoparticles comprising silicon dioxide nanoparticles.

11. The method of claim 1, wherein the treatment fluid further comprises from 0.1 to 0.5 vol. % gelling agent by volume of the treatment fluid and from 0.1 to 0.3 vol. % gel stabilizer by volume of the treatment fluid, the gelling agent comprising guar, hydroxyethyl cellulose, xantham gum, or combinations thereof and the gel stabiliser comprising methanol, sodium thiosulfate, or both.

12. The method of claim 11, wherein the treatment fluid further comprises from 0.1 to 0.3 vol. % crosslinker by volume of the treatment fluid, the crosslinker comprising borate, zirconium, chromium, antimony, titanium salts, or combinations thereof.

13. The method of claim 1, wherein the treatment fluid further comprises from 0.1 to 0.3 vol. % surfactant by volume of the treatment fluid, the surfactant comprising sodium laureth sulfate, cetyl trimethylammonium bromide, or both.

\* \* \* \* \*